US006779574B2

(12) United States Patent
Teeple et al.

(10) Patent No.: US 6,779,574 B2
(45) Date of Patent: Aug. 24, 2004

(54) TIRE WITH MULTIPLE CARCASS REINFORCEMENT PLIES HAVING BEADS OF SPECIFIED STRUCTURE

(75) Inventors: Robert Vanstory Teeple, Simpsonville, SC (US); James Endicott, Greenville, SC (US); Jean-Luc Bouvier, Greer, SC (US); Pierre Fraisse, Greer, SC (US); Jean-Claude Faure, Mozac (FR)

(73) Assignee: Michelin Recherche et Technique S.A., Grange-Paccot (CH)

( * ) Notice: Subject to any disclaimer, the term of this patent is extended or adjusted under 35 U.S.C. 154(b) by 63 days.

(21) Appl. No.: 09/995,340

(22) Filed: Nov. 27, 2001

(65) Prior Publication Data

US 2003/0098111 A1 May 29, 2003

(51) Int. Cl.[7] .......................... B60C 15/00; B60C 15/06
(52) U.S. Cl. ...................... 152/539; 152/547; 152/552; 152/554
(58) Field of Search ................................ 152/539, 540, 152/541, 542, 543, 546, 547

(56) References Cited

U.S. PATENT DOCUMENTS

| 5,323,830 A | * | 6/1994 | Diernaz ...................... 152/544 |
| 5,971,047 A | * | 10/1999 | Drieux et al. ................ 152/158 |
| 6,463,975 B1 | * | 10/2002 | Auxerre ...................... 152/454 |

FOREIGN PATENT DOCUMENTS

| JP | 2-293207 | * 12/1990 |
| JP | 2000-118209 | * 4/2000 |
| WO | WO 02/076767 | * 10/2002 |

OTHER PUBLICATIONS

Mechanics of Pneumatic Tires, Samuel Clark, United States Dept. of Commerce, 1971.*

* cited by examiner

Primary Examiner—Jeff H. Aftergut
Assistant Examiner—Justin Fischer
(74) Attorney, Agent, or Firm—Martin Ferrell; Felipe Farley; E. Martin Remick

(57) ABSTRACT

A tire with radial carcass reinforcement having beads with a heel portion on an axially inner side and a toe portion on an axially outer side includes two carcass reinforcement plies for tension in higher sidewall tires. The bead includes at least one bead wire coated with a rubber mix, a wedge formed of a rubber mix disposed axially outward of the at least one bead wire, and at least one rubber filler located axially and radially outward of the bead wire and wedge. The wedge is defined by two sides extending at an acute angle axially from an apex A located beneath the section of the at least one bead wire, the rubber mix forming the wedge having a Shore A hardness of at least 65 and greater than the Shore A hardness of the at least one rubber filler. According to one embodiment, a carcass reinforcement includes two plies, a first radial reinforcement ply wound on the at least one bead wire to form a first upturn, as viewed in meridian section, the reinforcement ply is wound about said bead wire passing from the heel to the toe of said at least one bead, the first upturn engaging the radially outer side the wedge and, a second radial reinforcement ply wound on said at least one bead wire, wherein, when viewed in meridian section, the second reinforcement ply is disposed in parallel to the first radial reinforcement ply in a sidewall area of the tire and is wound about said bead wire passing from the heel to the toe of said at least one bead with a second upturn extending into engagement with the radial inner side of the wedge.

5 Claims, 5 Drawing Sheets

TIRE WITH MULTIPLE CARCASS REINFORCEMENT PLIES HAVING BEADS OF SPECIFIED STRUCTURE

BACKGROUND OF THE INVENTION

The invention relates to a tire mountable on a rim having at least one frustoconical seat, the surface of which is defined by a generatrix having an axially outer end closer to the axis of rotation than the axially inner end.

Such a tire has been described in Publication WO 94/13498. It comprises at least a first bead mountable on a first rim seat which faces the axial outside of the rim. The first bead has a seat with a generatrix inclined to have the axially outer end closer to the axis of rotation than the axially inner end. The bead seat generatrix extends axially towards the outside surface of the tire to meet an outer face delimiting the bead toe, the outer face forming with the axis of rotation an angle γ, open radially and axially towards the outside and having a value of less than 90°. The radial carcass reinforcement of this tire, anchored in each bead to at least one inextensible annular bead ring, has, in meridian profile, when the tire is mounted on its service rim and inflated to its service pressure, a constant direction of curvature in the sidewall and bead terminated by the toe. The curvature of the meridian profile of the reinforcement is such that, in the bead, the tangent to the bead ring extending in the direction of the sidewall portion of the profile forms with the axis of rotation of the tire an angle φ open axially outward of at least 70°.

The bead of such a tire and more particularly the structure for anchoring the carcass reinforcement in the bead may take different forms. In PCT Publication WO 95/23073 (U.S. Pat. No. 5,971,047), the radial carcass reinforcement is anchored to the inextensible bead wire by passing around the wire from the heel to the toe of the bead to form an upturn extending in a rubber section. The rubber section is made of rubber mix in the form of a wedge defined by two sides extending from an apex A located beneath the meridian section of the coated bead wire. The radially outer side forms with a line parallel to the axis of rotation passing through the apex A an acute angle $\phi_1$, open radially towards the outside and between 20° and 70°, and the radially inner side forms with the same parallel line an acute angle $\phi_2$, open radially towards the inside. The rubber mix forming the rubber section axially adjacent to the bead wire has a Shore A hardness greater than the Shore A hardness(es) of the rubber mixes located axially and radially above the wire and the rubber section.

The tire described in Publication WO 95/23073 has a carcass reinforcement upturn having a length such that the upturn is in contact with the total perimeter of the rubber section or wedge, that is, is wrapped around the wedge. The upturn thus contacts the two radially outer and inner sides of the rubber section and the side opposite the apex of the rubber section. The free end of the upturn is spaced axially from the apex of the wedge, that is, away from the point of intersection of the radially outer and inner sides of the wedge. The part of the upturn extending axially outward from the bead wire may, optionally, first form the radially outer edge of the rubber section or wedge and then the radially inner side of said rubber section, finally extending beyond the wedge apex around the bead wire. Alternatively, the part of the upturn extending axially outward from the bead wire may form firstly the radially inner side of the rubber section or wedge, then the side opposite the apex of said wedge, and then finally the radially outer side of said rubber section, ending in the same manner as previously described.

The combination of the carcass reinforcement meridian profile such as described in Publication WO 94/13498 with a carcass structure hooking around a wedge as described in Publication WO 95/23073 makes it possible to obtain a very good compromise between the handling properties of the tire inflated to its recommended pressure and the those properties when the tire is at a pressure below the intended operating pressure, or even zero pressure. Whether the initial clamping on the rim is zero or some greater value, the axial displacement of the anchoring bead wire of the carcass reinforcement in combination with the axial disposition of the rubber section reinforced by the upturn obtains clamping of the toe of the bead on the rim seat. The axial displacement of the anchoring bead may result from the tension of carcass reinforcement, generated, for instance, by the inflation pressure of the tire. The value of this clamping increases as a function of the tension force to which the carcass reinforcement is subjected, and may become great in the case of high tension, for instance when one of the side walls of the tire is placed under great tension by a transverse force.

U.S. Pat. No. 6,179,028 describes an alternative solution of a tire with a radial carcass reinforcement wound, at least in the first bead, around the bead ring passing from the inside to the outside to form an upturn extending along the radially inner side of the rubber section in form of a wedge, then along the side opposite the apex A, and then axially and radially on the outside, at least in part, of the rubber section radially above the rubber section or wedge. The upturn has an end located radially above the reinforcement annular ring of bead and axially between the straight line, extending the radially outer side of the wedge, and the straight line perpendicular to the axis of rotation and tangent at N to the annular ring.

SUMMARY OF THE INVENTION

The tires described above include additional rubber sections radially outside and axially outside the wedge section and bead wire which have a hardness significantly less than the hardness of the wedge section. Accordingly, upon an increase of tension of the carcass reinforcement, the bead wire displaces towards the outside of the bead but creates compression of the wedge section, which produces a self-clamping of the toe of the bead on the mounting rim. This effect has been demonstrated with respect to passenger car tires.

In tires requiring relatively high sidewall tension, for example, light truck tires with relatively high aspect ratios, the single ply construction disclosed in the above publications may not provide sufficient sidewall tensile strength. Tires made by conventional tire building processes will typically require a multiple ply construction to obtain sufficient carcass burst strength while retaining an acceptable carcass reinforcement cord spacing. A difficulty with adding a carcass reinforcement ply to tires of the type described above is that the added layer thickness on the axial inside of the bead wire positions the bead wire closer to the axially outer edge of the tire bead, which reduces the mechanical advantage of the self-clamping force of the tire bead on the rim bead seat.

The inventors have discovered relationships between the positions of the ends of the carcass plies that can minimize the effect of the added thickness and retain the necessary overall bead self-clamping force.

According to the invention, a tire with radial carcass reinforcement having beads with a heel portion on an axially inner side and a toe portion on an axially outer side comprises at least one bead wire coated with a rubber mix and a wedge formed of a rubber mix disposed axially outward of the at least one bead wire. The wedge is defined by two sides extending from an apex A located radially inward of the at least one bead wire, a radially outer side of the wedge defining, with a reference line parallel to the axis of rotation of the tire and passing through the apex A, a first acute angle $\phi_1$ open radially outside, and a radially inner side forming with the reference line a second acute angle $\phi_2$, open radially toward the inside. A bead filler formed of a rubber mix is located axially and radially outside the coated bead wire and the wedge. The rubber mix forming the wedge has a Shore A hardness of at least 65 and which is greater than a Shore A hardness of the bead filler. The tire also includes a first radial reinforcement ply wrapped on the at least one bead wire to form a first upturn, wherein, when viewed in meridian section, the reinforcement ply is wound about the bead wire passing from the heel toward the toe of the at least one bead and engaging the radially outer side the wedge and a second radial reinforcement ply wrapped on the at least one bead wire, wherein, when viewed in meridian section, the second reinforcement ply is disposed in parallel to the first radial reinforcement ply in a sidewall area of the tire and is wound about the bead wire passing from the heel toward the toe of the at least one bead with a second upturn engaging the radial inner side of the wedge.

According to one embodiment, the first carcass reinforcement upturn surrounds a total perimeter of the wedge profile, and the second carcass reinforcement is disposed axially outward of the first carcass reinforcement with the second upturn terminating on the wedge and surrounded by the first upturn.

According to another embodiment, the second carcass reinforcement ply is disposed axially inward of the first carcass reinforcement ply in the sidewall of the tire, the first upturn extends from the bead wire directly to the radial outer side of the wedge and the second upturn extends from bead wire directly to the radially inner side of the wedge, the first and second upturns being arranged in a v-shape. According to another aspect, terminal portions of the first and second upturn may be folded back on the respective upturn.

According to yet another embodiment of the invention, a tire with radial carcass reinforcement having beads with a heel portion on an axially inner side and a toe portion on an axially outer side, comprises at least one bead wire coated with a rubber mix, a wedge formed of a rubber mix disposed axially outward of the at least one bead wire, the wedge defined by two sides extending from an apex A located beneath the section of the at least one bead wire, a radially outer side of the wedge defining, with a reference line parallel to the axis of rotation of the tire and passing through said apex A, a first acute angle $\phi_1$ open radially outside, and a radially inner side forming with the reference line a second acute angle $\phi_2$, open radially toward the inside, and a bead filler formed of a rubber mix located axially and radially outside the coated bead wire and the wedge, the wedge rubber mix having a Shore A hardness of at least 65 and greater than a Shore A hardness of the bead filler, a first radial reinforcement ply wound on the at least one bead wire to form an upturn, wherein, when viewed in meridian section, the reinforcement ply is wound about the bead wire passing from the heel toward the toe of the at least one bead, the first upturn surrounding the perimeter of the wedge and passing back around the bead wire to terminate radially above the bead wire, and, a second radial reinforcement ply disposed in parallel to the first radial reinforcement ply in the sidewall of the tire and terminating radially outward of the bead wire. In one embodiment, the second radial reinforcement ply is located axially outward of the first reinforcement ply and overlaps the upturn of the first radial reinforcement ply. According to another embodiment, the second radial reinforcement ply is located axially inward of the first reinforcement ply.

According to a further embodiment, a tire with radial carcass reinforcement having beads with a heel portion on an axially inner side and a toe portion on an axially outer side, comprises at least one bead wire coated with a rubber mix, a wedge formed of a rubber mix disposed axially outward of the at least one bead wire, the wedge defined by two sides extending from an apex A located beneath the section of the at least one bead wire, a radially outer side of the wedge defining, with a reference line parallel to the axis of rotation of the tire and passing through the apex A, a first acute angle $\phi_1$ open radially outside, and a radially inner side forming with the reference line a second acute angle $\phi_2$, open radially toward the inside, a bead filler located axially and radially outward of the bead wire and wedge, the wedge rubber mix having a Shore A hardness of at least 65 and being greater than the Shore A hardness the bead filler, a radial reinforcement ply wound on the at least one bead wire to form an upturn, wherein, when viewed in meridian section, the reinforcement ply is wound about the bead wire passing from the heel to the toe of the at least one bead, the first upturn surrounding the perimeter of the wedge and passing back around the bead wire and extending radially outward to terminate in a shoulder of the tire.

Preferably, the tire comprises a second bead axially opposite the first bead and having a seat of the same configuration as the seat of the first bead, i.e., a seat the generatrix of which has an axially inner end on a circle of diameter greater than the diameter of the circle on which is the axially outer end or seat inclined towards the outside.

The two bead seats may have unequal diameters.

The meridian profile of the carcass reinforcement, when the tire is mounted on its service rim and inflated to its service pressure, has a constant direction of curvature, at least in the first bead and the sidewall which extends it, and the tangent TT' to the point of tangency T of said profile with the reinforcement of the said bead forms with the axis of rotation an angle $\phi$ open towards the outside at least equal to 70°.

BRIEF DESCRIPTION OF THE DRAWINGS

The invention will be better understood with reference to the appended drawings, which are not drawn to scale to more clearly illustrate the invention, in conjunction with the following detailed description, in which drawings.

DETAILED DESCRIPTION

Figure 1:
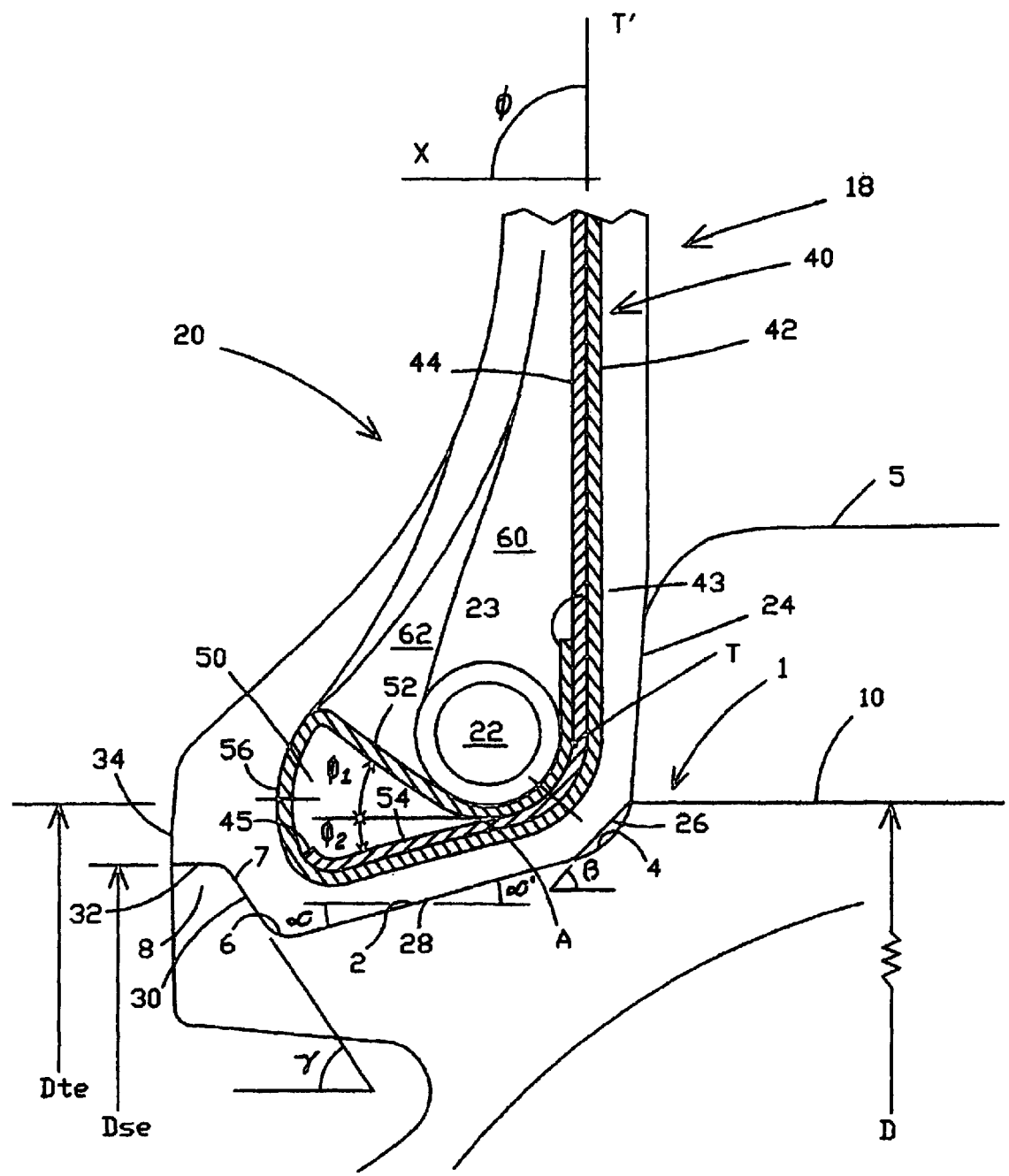
FIG. 1 illustrates a section view of a tire bead in accordance with the invention mounted on a rim, as viewed in the meridian plane, having two carcass plies wrapped around the bead wire.

FIG. 1 illustrates a section of a tire bead 20 in accordance with a first embodiment of the invention. A rim 1, on which the tire is mounted, includes two frustoconical rim seats 2 (one of which is shown). The rims seats 2 are defined by generatrices which form with the axis of rotation X of the tire an angle a, open towards the axial outside of the tire (to the left in FIG. 1), of between 4° and 30°, and in the illustrated example is shown as approximately 14°. The axially inner ends 4 and outer ends 6 of the rim seats 2 describe circles in the equatorial plane. The diameter of the axially outer end 6 is smaller than the diameter of the axially inner end 4, which makes the rim seat 2 incline axially outward.

As further described below, the tire bead 20 includes a reinforcing bead wire 22, a wedge 50, and a carcass reinforcement 40 engaged with the bead wire and wedge to anchor the carcass reinforcement in the bead.

The rim seat 2, which may be disposed, for example, towards the outside of the vehicle, extends axially on the outside to a projection or hump 8. An inner face 7 forms with the axis of rotation an angle γ. A diameter $D_{SE}$ of the projection 8 (all diameters being measured relative to the axis of rotation of the tire) is less than the inner diameter $D_{TE}$ of the bead wire 22. The height of the projection 8, measured radially with respect to the axially outer end 6 of the rim seat 2, is comparable with the height of humps or projections utilized axially on the inside of conventional rims for passenger cars. Toward the axial inside of the wheel, the rim seat 2 connects to a cylindrical bearing surface 10 for mounting a supporting insert 5 for deflated operation. The diameter D of the cylindrical portion 10 is the nominal diameter of the rim.

The contour of the tire bead 20, comprises, moving axially from the inside, an inner wall 24 substantially perpendicular to the axis of rotation. The inner wall 24 adjoins a frustoconically shaped heel 26 forming with the axis of rotation an angle β, which is illustrated to be about 45°. The heel 26 is open axially towards the inside and radially towards the outside. The heel 26 adjoins a frusto-conically shaped tire bead seat 28, which forms with the direction of the axis of rotation an angle α', open axially towards the inside and radially towards the outside. The angle α' of the bead seat generatrix in the illustration is 15°. The tire bead seat angle α' is greater than the angle α of the rim bead seat 2. The heel 26 and tire bead seat 28 are said to be inclined towards the outside, meaning an axially outer end of each surface is on a circle of diameter less than the diameter of the circle on which an axially inner end is located.

A third frustoconically shaped surface forming a tire bead toe 30 extends axially outward from the tire bead seat 28, and forms an angle γ less than 90°, and as shown is approximately to 45°, open axially and radially towards the outside. The angle γ of the tire bead toe 30 is substantially equal to the angle γ of the inner wall 7 of the rim hump 8.

A lip 32 extends axially outward from the tire bead seat 28 and is generally parallel to the axis of the tire. An outer wall 34, which is curved in the example described and is of substantially perpendicular general orientation to the direction of the axis of rotation of the rim, completes the contour of the bead.

The tire bead seat 28 bears on the rim bead seat 2 when the tire is mounted on the rim, while the toe 30 bears on the inner wall 7 of the hump 8.

The bead wire 22 is disposed near the heel 26 of the bead. The bead wire 22 is in the equatorial plane a ring shaped element, and may have a variety of constructions, for example, a single wire wound to produce a multiple turn coil, a solid core surrounded by helically wound layers, or a tape of wires wound into layers. The bead wire 22 is coated with a rubber mix layer 23 having a high Shore A hardness.

A wedge 50, formed of a rubber mix, is disposed axially to the outside of the anchoring bead ring 22. The wedge 50, when viewed in the equatorial plane is substantially ring shaped. The wedge 50 has an apex or center A located radially below the bead wire 22. The wedge 50 is defined by a radially inner side 52 and a radial outer side 54 both extending axially outward from the apex A, and a third side 56 opposite the apex. The side 52 radially on the outside forms an angle $\phi_1$ with a line parallel to the tire axis of rotation and open radially and axially towards to the outside. In the embodiment of FIG. 1, the angle ($\phi_1$ is 45° and may be in a range of 20° to 70°. The radially inner side 54 forms an angle $\phi_2$ with the same parallel line and opens radially towards to the inside and axially towards the outside. In the illustrated embodiment, the angle $\phi_2$ is approximately 15° and may be in a range of 0° to 30°. The wedge 50 is made of a rubber mix having a relatively high Shore A hardness, a value of at least 65 and preferably about 94 in the vulcanized state.

Radially outward of the bead ring 22 is a rubber filler 60 formed of rubber mix having a Shore A hardness of 37. Radially outward of the wedge 50 and axially outward of the rubber filler 60, is a second rubber filler 62 formed of rubber mix having a Shore A hardness substantially equal to that of the rubber filler 60 and therefore significantly less than the hardness of the mix of the rubber section 50. Alternatively, the rubber fillers 60 and 62 may be formed as a single component. The relative locations and hardnesses of the rubber elements 50, 60 and 62 make it possible, upon an increase of tension of the carcass reinforcement, to facilitate the axial displacement of the bead ring 22 towards the axial outside direction and thus create a compression of the rubber section 50 and a self-clamping of the toe 30 of the bead on the mounting rim 20. In the described example, the initial clamping of the bead 20 on the rim is practically zero, owing to the quasi-equality between the angles of the rim and bead seats.

The tire includes a carcass reinforcement 40 having two layers in at least the sidewall portion of the tire. The carcass reinforcement 40 has in meridian profile, when the tire is mounted on its service rim and inflated to its service pressure, a constant direction of curvature over its entire length. A tangent TT' drawn radially outward from a point of tangency T with the bead ring 22 and along the carcass reinforcement 40 forms, with the axis of rotation, an angle φ open radially and axially towards the outside and at least equal to 70° and preferably equal to 80°.

The carcass reinforcement 40 is wrapped around the bead wire 22 passing in the direction from the heel 26 to the toe 30 of the bead, or from the axial inside to the outside, to form an upturn extending along the radially inner side 54 of the rubber section 50.

According to a first embodiment, illustrated in FIG. 1, the carcass reinforcement 40 comprises two individual plies 42, 44 wrapped around the bead wire 22. A first ply 42 is disposed axially inward in the sidewall region and extends below the bead wire, with an upturn wrapped around the wedge 50 and extending back under the bead wire toward the sidewall. The end 43 of the first upturn is located radially above the center of the bead wire 22. The second ply 44 is disposed axially outward of the first ply 42 in the sidewall, and is wrapped under the bead wire 22. The second ply 44 has an upturn 45 in contact with and terminating on the radially inward side 54 of the wedge 50.

Figure 2:
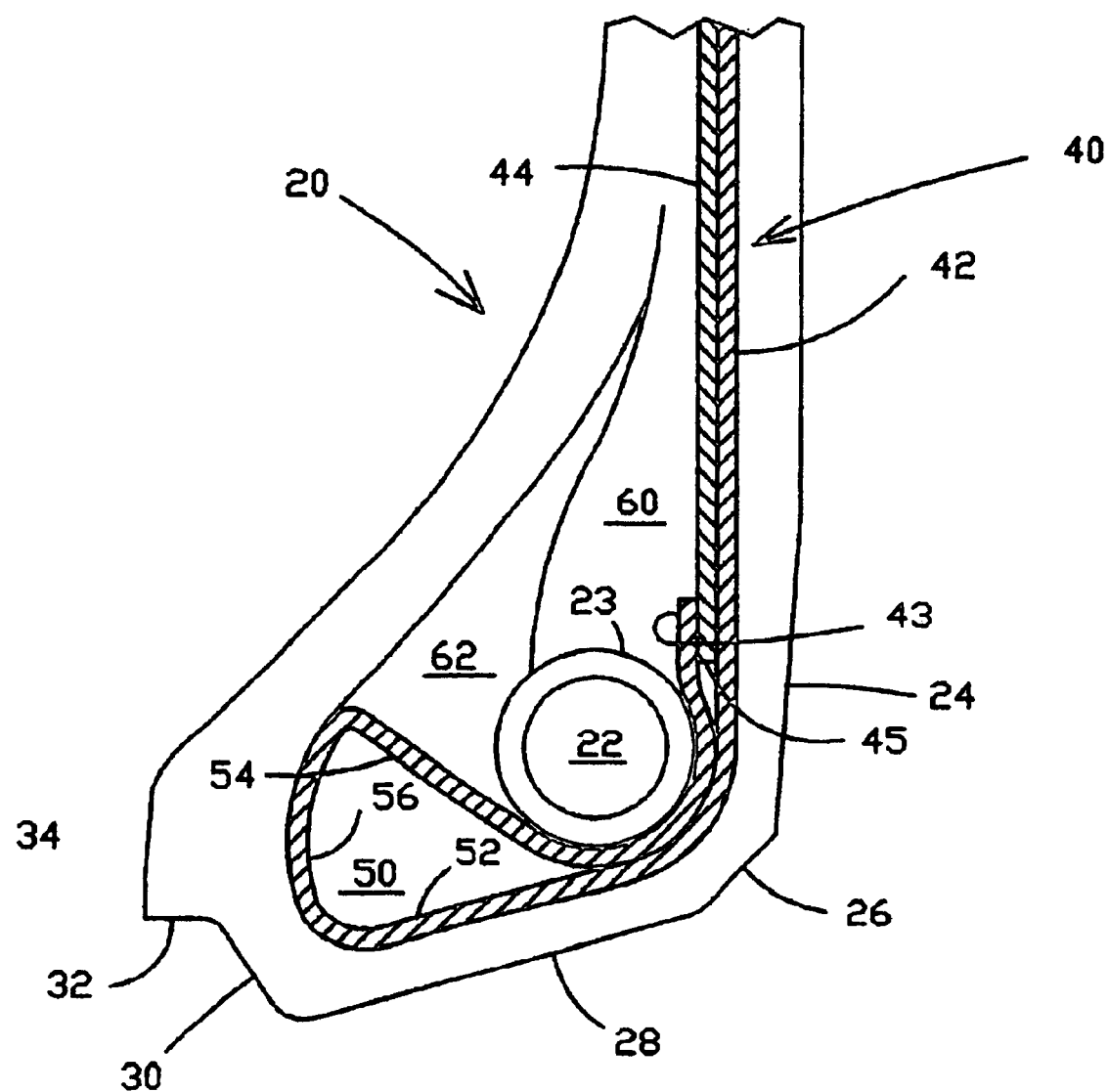
FIG. 2 illustrates in section view in the meridian plane a second embodiment of the tire bead in accordance with the invention having two carcass plies, one of which is wrapped around the bead wire, the respective ends of the plies overlapping radially above the bead wire.

According to another embodiment, illustrated in FIG. 2, the reinforcing carcass 40 comprises two plies. A first ply 42 is axially inwardly located in the sidewall 24, and is wrapped around the bead wire 22. An upturn of the first ply 42 wraps around the first side 52, opposite side 56, and radially outward side 54 of the wedge 50, back around the bead wire 22, and terminates above the bead wire. A second ply 44 is axially outwardly located in the sidewall 24 and has an end 45 that is overlapped by the end 43 of the first ply 42 and terminates above the bead wire 22.

Figure 3:
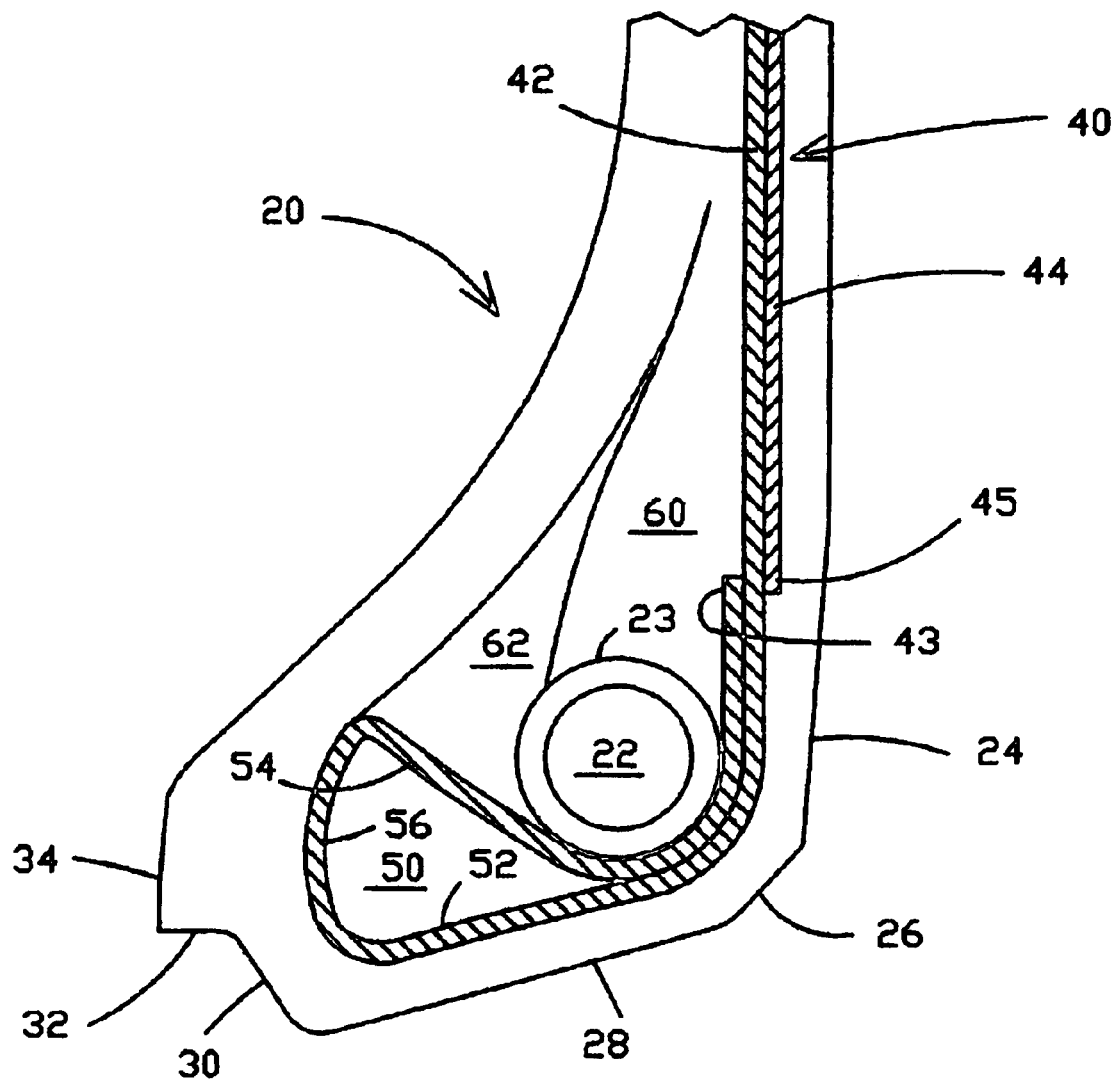
FIG. 3 illustrates a variation of the embodiment of FIG. 2, in which a second ply not wound on the bead wire is axially inward of a first ply.

Alternatively, as illustrated in FIG. 3, the reinforcing carcass 40 comprises a first ply 42 that is axially outwardly located in the sidewall 24, and is wrapped around the bead wire 22. An upturn of the first ply 42 wraps around the first side 52, opposite side 56, and radially outward side 54 of the wedge 50, back around the bead wire 22, and terminates above the bead wire. A second ply 44 is axially inwardly located in the sidewall 24 relative to the first ply 42 and has an end 45 that terminates above the bead wire 22 at about the same radial location as the end 43 of the first ply.

Figure 4:
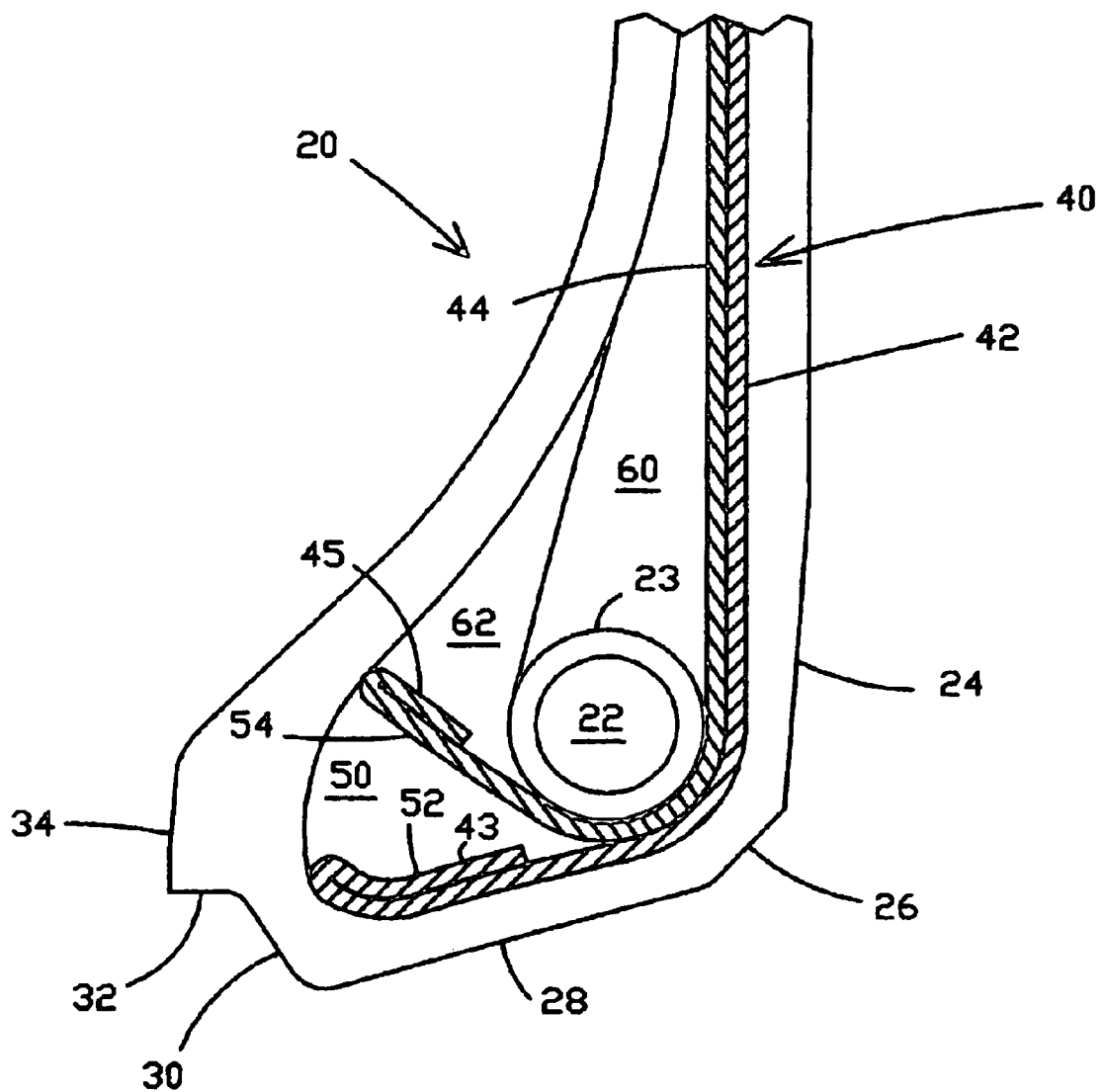
FIG. 4 illustrates another embodiment of the tire bead in section view in the meridian plane, having two carcass plies wrapped around the bead wire and diverging therefrom.

According to another embodiment, illustrated in FIG. 4, the carcass reinforcement 40 comprises a first ply 42 located axially inward in the tire sidewall 24, and wrapped around the bead wire 22 with an upturn 43 in direct contact with the radially inward side 52 of the wedge 50. The upturn 43 of the first ply 42 terminates at the inward surface 52, and is shown folded onto itself. Alternatively, the upturn 43 can be made shorter to terminate on the inward surface 52 without folding. A second ply 44 is axially outward of the first ply 42 in the sidewall 24, and is wrapped around the bead wire 22 with an upturn 45 in contact with the radially outward surface 54 of the wedge 50. The second upturn 45 is also shown folded, and also, alternatively, may be made shorter to terminate without folding.

Figure 5:
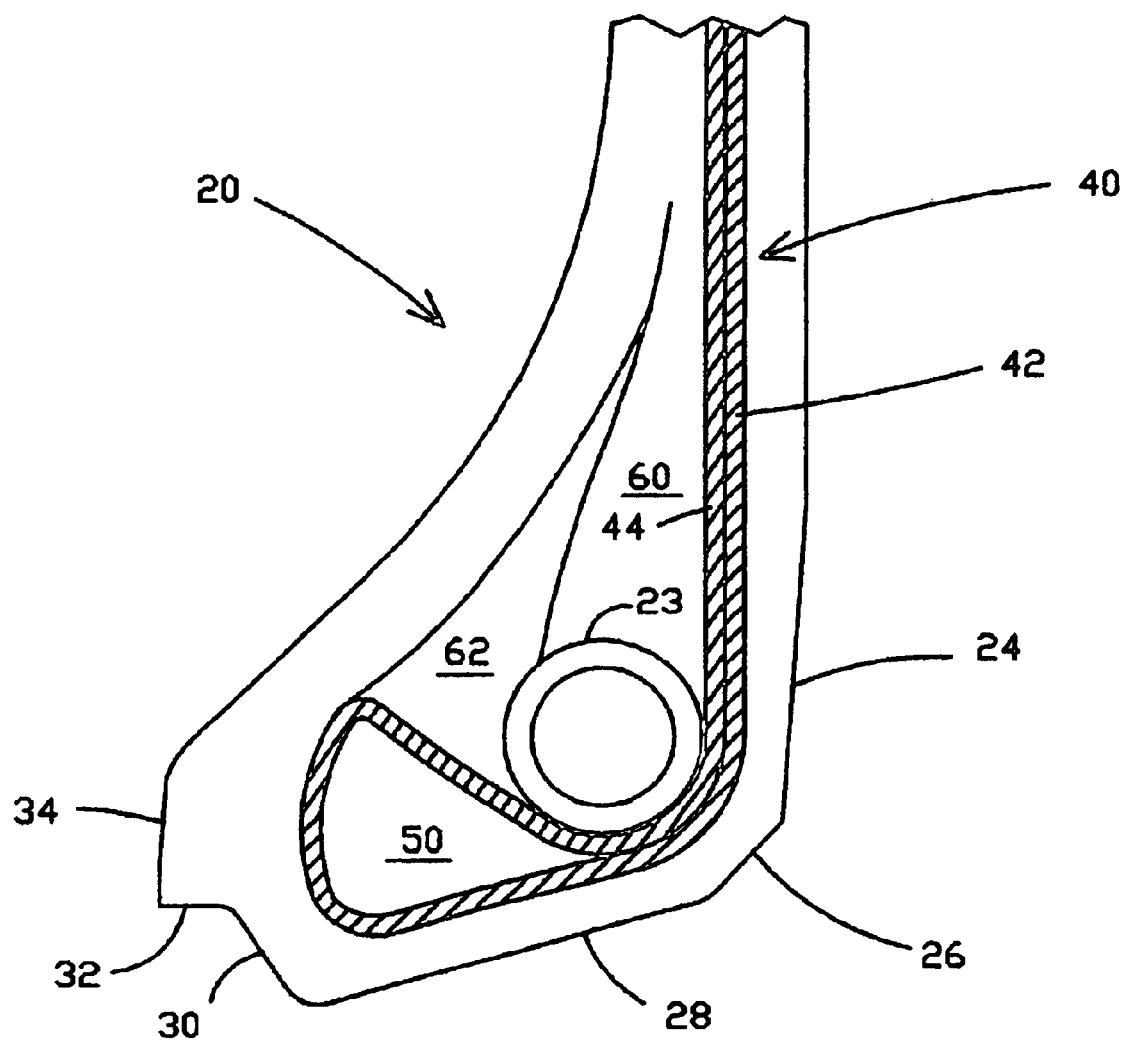
FIG. 5 illustrates yet another embodiment of the tire bead in section view in the meridian plane having a single carcass sheet wrapped around the bead wire to form two plies.

Yet another embodiment is shown in FIG. 5. According to FIG. 5, the carcass reinforcement 40 comprises a single sheet element having a length sufficiently long to form two plies 42, 44. A first ply is located axially inward and wraps around the bead wire 22, around the outer surfaces of the wedge 50 from the radially inward 52 to opposite 58 to the radially outward surface 54, and back around the bead wire. The sheet then forms a second ply 44 located axially outward of the first ply 42 that extends to a termination in the shoulder of the tire (not shown), to form a shoulder lock construction as will be understood by those skilled in the art.

The arrangement of the carcass reinforcing plies 42, 44 allows for the anchoring effect of the bead wire 22 on the wedge 50 when the carcass is under tension, as described above. The location of the ends of the plies substantially avoids stress locations for the propagation of cracking in the bead rubber products. As may be appreciated, the various embodiments show no more than three layers on the bead wire 22, which minimizes any axially outward displacement of the bead wire.

What is claimed is:

1. A tire with radial carcass reinforcement having beads with a heel portion on an axially inner side and a toe portion on an axially outer side, comprising:

at least one bead wire coated with a rubber mix;

at least one bead filler formed of a rubber mix disposed axially outward and radially outward of the bead wire;

a wedge formed of a rubber mix disposed axially outward of the at least one bead wire and radially inward of the at least one bead filler, the wedge defined by two sides extending from an apex located radially beneath the section of the at least one bead wire, a radially outer side of the wedge defining, with a reference line parallel to the axis of rotation of the tire and passing through the apex, a first acute angle $\phi_1$ open radially outside, and a radially inner side forming with said reference line a second acute angle $\phi_2$, open radially toward the inside, the rubber mix having a Shore A hardness of at least 65 and being greater than the Shore A hardness of the rubber mix forming the at least one bead filler;

a first radial reinforcement ply wound on said at least one bead wire to form a first upturn, wherein, when viewed in meridian section, the reinforcement ply is wound about said bead wire passing from the heel toward the toe of said at least one bead, the first upturn engaging the radially outer side the wedge; and, a second radial reinforcement ply wound on said at least one bead wire, wherein, when viewed in meridian section, the second reinforcement ply is disposed in parallel to the first radial reinforcement ply in a sidewall area of the tire and is wound about said bead wire passing from the heel toward the toe of said at least one bead with a second upturn engaging the radial inner side of the wedge.

2. The tire as claimed in claim 1, wherein the first carcass reinforcement upturn surrounds a total perimeter of the wedge profile, and wherein the second carcass reinforcement is disposed axially outward of the first carcass reinforcement in a sidewall of the tire and the second upturn is surrounded by the first upturn.

3. The tire as claimed in claim 2, wherein the bead wire comprises a solid core wire surrounded by helically wound layers.

4. The tire as claimed in claim 2, wherein the bead wire comprises a wire wound circumferentially to form a multiple turn coil.

5. The tire as claimed in claim 1, wherein the first angle $\phi_1$ is between 20° and 70° and the second angle $\phi_2$ is between 0° and 30°.

* * * * *